June 1, 1926.

J. H. HANKEY

MAGNETIC VALVE FOR ORGANS AND THE LIKE

Filed April 17, 1925

1,587,380

Inventor

Patented June 1, 1926.

1,587,380

UNITED STATES PATENT OFFICE.

JOHN H. HANKEY, OF HAGERSTOWN, MARYLAND, ASSIGNOR TO THE W. H. REISNER MFG. CO., INC., OF HAGERSTOWN, MARYLAND, A CORPORATION OF MARYLAND.

MAGNETIC VALVE FOR ORGANS AND THE LIKE.

Application filed April 17, 1925. Serial No. 23,889.

The invention relates to certain improvements in magnetic valves for organs and like instruments in which a valve disk is actuated by an electromagnet to uncover an air port, said valve disk involving a magnetic element, such as a soft iron plate, which will be attracted by the electromagnet when the latter is energized, a typical device of this general character being exemplified in Patent No. 1,387,664, dated August 16, 1921. The object of the invention is to so construct the valve disk that the facing elements, associated with the soft iron core, which elements serve on the one hand to provide an air-tight seal between the valve and its seat and, one the other, to prevent the soft iron core freezing to the poles of the magnet, will not be impaired or deranged by the normal operation of the valve mechanism. To these ends, the invention comprises a composite disk, including a disk or plate of magnetic material, such as soft iron, facing disks or plates of paper, or similar material, disposed on opposite faces of the disk or plate of magnetic material, and a rim of non-magnetic material, such as sheet copper, formed about and embracing the peripheral edges of the composite valve structure, preferably in such manner as to compress the marginal and peripheral portions of the facing members, so that the centers of the latter extend beyond the planes of the rim.

The invention is illustrated in the accompanying drawings, in which:—

Figure 1:
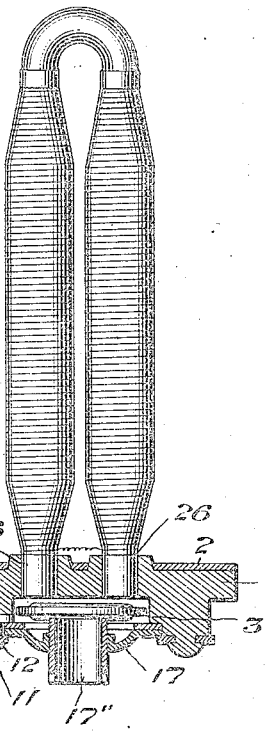
Fig. 1 is a side elevation, partly in section, of a typical electromagnetic valve, including the novel form of valve disk.
Figure 2:
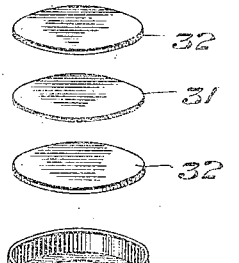
Fig. 2 is an exploded view showing the several elements which make up the composite disk valve, in the order of assembling the same.

Referring to the drawings, 1 indicates the base plate or support, which is usually formed as a casting of relatively soft metal alloy, provided on its under face with a chamber or recess 4 constituting a windway defined by a continuous flange 5 forming an integral part of the base plate 1, said chamber 4 terminating in a port or opening 3 through the top of the base 1. The chamber 4 is closed by a cover plate 15, which is removably secured to the base 1 by means of a pivoted latch 20 having a hooked end, which engages a recess in the reduced end 11 of a stud 10 formed integral with and projecting from the base portion 1. The said cover plate is also provided with an extruded or convexed boss-like member 17 substantially opposite the poles 26—26 of the electromagnet secured to the base, said boss having a central screw threaded opening in which is adjustably mounted an externally screw threaded thimble 17", which constitutes a valve seat, which is adjustable toward and from the poles of the magnet aforesaid.

Figure 3:
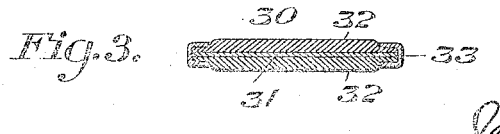
Fig. 3 is a vertical cross section through the valve disk.

Mounted within the recess, above the valve seat, is a valve disk 30, which normally engages the upper edge of the nipple 17" to close the port through the said thimble to the passage of air, said valve disk being lifted from its seat on the thimble, when the electromagnet is energized. Said valve disk comprises a central sheet 31 of magnetic material, preferably soft iron, and two cover sheets 32–32 disposed on opposite sides thereof, preferably formed of paper, or similar flexible fabric, the three circular sheets or disks being secured rigidly together by means of an annulus of sheet copper, or equivalent material, which embraces the peripheral edges of the assembled disks and overlies the peripheral margins of the fabric disks and compresses said peripheral margins below the normal planes of the outer surfaces of said fabric disks, as more particularly illustrated in Fig. 3. The confining rim or annulus is first formed as a cup-like member 33' having an opening in its bottom, into which cup-like member said disks 31 and 32 are placed in proper sequence, after which the vertical rim of the member 33' is either spun or compressed to form an inwardly extending annular flange parallel with and substantially co-extensive with the flange constituting the bottom of the cup-like member 33'. The two fabric facing members of the valve disk project beyond the rim embracing annulus 33, so that the lower cover member 32 constitutes a yielding resilient surface engaging the valve seat to effectively close the valve port in the thimble 17", while the upper facing member 32, similarly projecting beyond the plane of the upper rim of the annulus 33, engages the poles of the electromagnet when the valve disk is attracted and prevents the sticking of the valve disk to the magnet poles.

It has been the practice heretofore to provide the valve disks of electromagnetic valves for organs and like instruments with cover sheets of paper glued or cemented to the opposite faces of the valve disks proper, which are of soft iron, or other magnetic material, but it was found that these paper coverings are frequently damaged or deranged by the constant operation of the valve, and the present invention is designed to obviate these difficulties and to provide a strong and durable valve disk in which the parts cannot be accidentally displaced and the cover sheets, consisting of paper, or equivalent fabric, are permanently secured to the intermediate disk of magnetic material and serve their normal functions without danger of impairment or derangement, the resultant valve disk being especially effective and durable under the most exacting conditions of use.

What I claim is:—

A valve disk for electric organ actions comprising an intermediate sheet of magnetic material, outer sheets of fabric, and an annulus embracing the edges of the superposed sheets and having lateral flanges overlying and compressing the peripheral margins of the fabric sheets below the outer surfaces of the latter.

In testimony whereof I affix my signature.

JOHN H. HANKEY.